US008422887B2

(12) United States Patent
Haramaty et al.

(10) Patent No.: US 8,422,887 B2
(45) Date of Patent: Apr. 16, 2013

(54) SYSTEM FOR REDUNDANCY IN ETHERNET PASSIVE OPTICAL NETWORKS (EPONS)

(75) Inventors: Zachy Haramaty, Ramat Gan (IL); Yaniv Kopelman, Mishmeret (IL); Alon Meirson, Beit Dagan (IL); Lior Khermosh, Givatayim (IL)

(73) Assignee: PMC Sierra Ltd, Herzlia Pituach (IL)

( * ) Notice: Subject to any disclaimer, the term of this patent is extended or adjusted under 35 U.S.C. 154(b) by 262 days.

(21) Appl. No.: 12/697,253

(22) Filed: Jan. 31, 2010

(65) Prior Publication Data

US 2011/0188849 A1 Aug. 4, 2011

(51) Int. Cl.
  *H04J 14/00* (2006.01)
  *H04B 10/00* (2006.01)
(52) U.S. Cl.
  USPC ............... 398/151; 398/67; 398/167.5
(58) Field of Classification Search ............. 398/66–73
  See application file for complete search history.

(56) References Cited

U.S. PATENT DOCUMENTS

| | | | |
|---|---|---|---|
| 6,317,829 B1 * | 11/2001 | Van Oorschot | 713/155 |
| 7,865,077 B2 | 1/2011 | Mukojima | |
| 8,019,220 B2 | 9/2011 | Ozaki | |
| 2002/0110245 A1 | 8/2002 | Gruia | 380/278 |
| 2002/0176130 A1 * | 11/2002 | Maeno | 359/110 |
| 2005/0041972 A1 * | 2/2005 | Kim et al. | 398/78 |
| 2005/0047602 A1 * | 3/2005 | Lee et al. | 380/284 |
| 2006/0029389 A1 * | 2/2006 | Cleary et al. | 398/33 |
| 2006/0053309 A1 * | 3/2006 | Vereen et al. | 713/300 |
| 2006/0093356 A1 * | 5/2006 | Vereen et al. | 398/33 |
| 2007/0201698 A1 * | 8/2007 | Huh et al. | 380/256 |
| 2007/0268818 A1 * | 11/2007 | Sugihara | 370/216 |
| 2008/0037981 A1 * | 2/2008 | Mukojima | 398/10 |
| 2008/0195881 A1 * | 8/2008 | Bernard et al. | 713/340 |
| 2008/0212964 A1 * | 9/2008 | Gao et al. | 398/58 |
| 2008/0304519 A1 | 12/2008 | Koenen | |
| 2009/0263127 A1 * | 10/2009 | Haran et al. | 398/38 |
| 2010/0040369 A1 * | 2/2010 | Zhao et al. | 398/58 |
| 2010/0208898 A1 * | 8/2010 | Acar et al. | 380/280 |
| 2012/0128155 A1 * | 5/2012 | Effenberger | 380/256 |

OTHER PUBLICATIONS

IEEE 802.3—Telecommunications and Information exchange between systems, Local and Metropolitan area networks, "Part 3: Carrier sense multiple access with collision detection (CSMA/CD) access method and physical layer specifications" IEEE Computer Society. Dec. 2005. pages 1-626.

* cited by examiner

*Primary Examiner* — Nathan Curs
*Assistant Examiner* — Tanya Ngo
(74) *Attorney, Agent, or Firm* — Mark M. Friedman (57) ABSTRACT

A system for redundancy in Ethernet passive optical networks (EPONs) facilitates fast recovery from failure (less than 50 msec), path redundancy of the fiber optic network, and location redundancy of the OLTs. An optical networking unit (ONU) in a normal state monitors input communications, and when the input communications are quiet for a predetermined minimum length of time, the ONU transitions to a lenient state in which: the ONU accepts old and new security keys; upon receiving a packet: the ONU updates an ONU timestamp based on the packet's timestamp; and the ONU transitions to the normal state of operation. While the ONU is in the lenient state if a packet is not received for a predetermined given length of time the ONU transitions to a deregistered state. In this system, main and standby OLTs do not require synchronization of security parameters or synchronization for differences in fiber lengths.

11 Claims, 4 Drawing Sheets

PRIOR ART

SYSTEM FOR REDUNDANCY IN ETHERNET PASSIVE OPTICAL NETWORKS (EPONS)

FIELD OF THE INVENTION

The present embodiment generally relates to the field of communications networks, and in particular, concerns a system for redundancy in Ethernet passive optical networks.

BACKGROUND OF THE INVENTION

Figure 1:
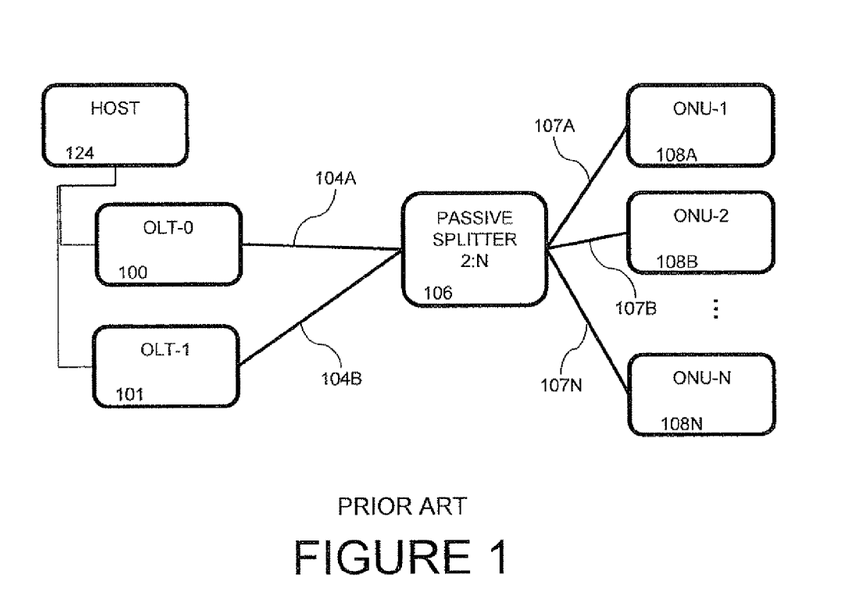
FIG. 1, a diagram of an EPON network

Background information on technology and terms can be found in the IEEE 802.3 specification (particularly clauses 64 and 65 for 1 gigabit [1 G] and the to-be-released clauses 76 and 77 for 10 gigabit [10 G]). The need for redundancy in networks, and in particular in Ethernet passive optical networks (EPONs) is known in the art. Referring to FIG. 1, a diagram of an EPON network, an OLT (optical line transmission equipment of the network provider) (100, 101) communicates over a fiber optic network (104A, 104B, and 107A, 107B, 107N) with ONUs (optical networking units associated with a user) 108A, 108B, 108N. A passive splitter 106 facilitates either OLT-0 100 or OLT-1 101 communicating with the ONUs 108A, 108B, 108N. A host 124 provides configuration information, command, control, and monitoring of the OLTs (100, 101). A variety of architectures can be used to provide redundancy of the fiber optic network and the EPON communications standard includes features to facilitate recovery from a network failure. Redundancy in an EPON system facilitates continuity of service including switchover from a first OLT (sometimes called the "main") to a second OLT (sometimes called the "standby") and/or from a first network to a second network. This switchover can include alternative OLTs and fiber optic cables.

US publication 2008/0037981 A1 to Toshiaki Mukojima for Optical communication system with N+1 redundancy teaches a system for two or more active interfaces, each controlling the transmission and reception of optical signals between a communication network and one or more subscriber terminals. The control information used by all the active interfaces is stored in a common memory accessible to all of the interfaces. If a fault is detected in an active interface, a standby interface extracts the control information of the faulty interface from the memory and sends the control information to the standby interface. The interfaces are necessarily co-located because the control information includes the RTT (round trip time) data. Also required is an optical switching apparatus that switches data transmission paths among the network, the active and standby interfaces, and the subscriber terminals.

US publication 2008/0025724 A1 to Hirokazu Ozaki for PON system, station side device and redundant method used for the same teaches a system including a plurality of PONs, a plurality of ONUs, and a station side device including a plurality of PON interface sections using one or more optical switch devices to provide 1:N redundancy of the PONs by cascading the N optical switch modules. The PON interface sections are co-located in the station side device and it is assumed that a value of an adjusted optical channel length inside the station side device is set.

US publication 2007/0268818 A1 to Youichi Sugihara for Station side transmission unit, operation control method for station side transmission unit, and optical networking using station side transmission unit teaches a method for redundant units closing and releasing closure of their interfaces to switch between active units for a PON network. While this method provides physical layer switching, this method does not address the service or operational aspects of network failure and recovery.

In the context of this document a failure includes a problem with the OLT (100, 101), such as an internal logic failure or general power failure, or a problem with the fiber optic network, such as a break in the fiber optic cable 104A, 104B between an OLT and a first node 106 on the fiber optic network. Many conventional redundancy techniques provide switchover from a main OLT to a standby OLT, and after a delay, service is restored to the ONU in accordance with the established specifications. OLT redundancy in EPON systems is relatively simple when the switchover time can be relatively long, approximately 1 second. In this case, the ONUs deregister, the standby OLT comes online, all the ONUs re-register, and service is eventually restored to all of the ONUs.

An ONU will deregister under certain conditions, including:

1. A long time, normally greater than 300 msec, has passed without the ONU receiving any downstream GATE packets.

2. There is a timestamp drift of greater than 16 TQ (256 nsec) in the timestamp received from the OLT by the ONU (1 TQ, or Time Quanta is 16 nsec). A timestamp drift can occur when switching from a first OLT using a first clock to a second OLT using a second clock, where the clocks are not synchronized. Even with synchronized clocks, a difference in the lengths of the fiber optic cable from each of the OLTs to the first node on the fiber optic network is a source of timestamp drift.

3. A new OLT not having the current security key for an ONU. When an OLT sends data using a security key that an ONU is no longer using, the ONU will not recognize the data. Because the ONU does not recognize the data, the ONU will be in a state of not receiving data, and after a given time has elapsed without the ONU receiving data, the ONU will deregister. In a case where the control packets are not encrypted, the ONU will still not be able to recognize the data, and will be in a state of not receiving data. In the context of this document, data is used as a general reference to all information communicated, unless otherwise specified. In a case where the data that the system secures is only the data packets, but the control packets are sent unencrypted, the ONU will similarly be in a state of not receiving data.

When an ONU deregisters, the conventional time to recover is approximately 1 second and typically between 300 msec and 1500 msec. This conventional time to recover is no longer sufficient for new applications being deployed and applications planned for future deployment. Application providers are now demanding a time to recover of less than 50 msec in order to provide new applications and a higher level of service to users. To achieve recovery within this timeframe, the ONUs cannot be allowed to deregister when switching to a redundant OLT.

Conventional redundancy implementations typically co-locate the redundant OLTs in order to share common resources, synchronize OLTs, or minimize differences in the length of fiber optic cables. A popular implementation of OLTs is as a printed circuit board, with multiple OLTs deployed in a single chassis at a network provider's facility and a single host controlling the OLTs. However, in a case where each OLT has a clock generator for the OLT's timestamp counter, the timestamp counters are not synchronized. The timestamp counters advance every 16 nsec (1 TQ), and synchronization requires at least 2 wires (1 wire for clock and 1 wire for reset) connected between the OLTs. This case is a difficult implementation with strict physical limitations.

There are variances in the round trip delay (RTT) due to the different lengths of the fiber optic cable from each of the OLTs to the first node on the fiber optic network. In this case, synchronizing the RTT is a manual process that again has strict physical limitations. In addition, co-locating OLTs and hosts exposes the system to failure due to lack of location redundancy. In the context of this description, location redundancy refers to deploying portions of the system at physically diverse locations. In one non-limiting example of location non-redundancy, a main and a standby OLT are both located in the same room. A natural disaster, such as flooding, an accident, such as a fire, or power shutdown for routine maintenance affect both the main and standby OLTs resulting in a failure of the EPON.

Conventional techniques for synchronizing security keys include maintaining a real-time database of the current security key for each ONU. As stated earlier, if a new OLT does not have the current security key for an ONU then the ONU will not recognize the data being sent from the new OLT, potentially causing the ONU to deregister and the data to be discarded. Synchronizing security keys at real time between two OLTs is a complex technique, possibly requiring extensive hardware wiring between OLTs.

It is thus desirable to have a system for EPON redundancy that provides recovery in less than 50 msec. It is further desirable to have redundancy of multiple layers of the EPON, including network provider OLT (equipment redundancy), the fiber optic network (path redundancy), and physical location (location redundancy).

SUMMARY

A system for redundancy in Ethernet passive optical networks (EPONs) includes: at least one optical networking unit (ONU), wherein when the ONU is in a normal state the ONU monitors input communications, and wherein when the input communications are quiet for a predetermined minimum length of time the ONU transitions to a lenient state in which: the ONU accepts old and new security keys; upon receiving a packet: the ONU updates an ONU timestamp based on said packet's timestamp; and the ONU transitions to said normal state of operation; and wherein while the ONU is in the lenient state, if a packet is not received for a predetermined given length of time the ONU transitions to a deregistered state.

In an alternate implementation, upon receiving the packet the ONU further updates an ONU security counter based on the packet's security counter.

In an alternate implementation, the system further includes at least two optical line transmission equipment (OLT) wherein a first OLT is deployed at a first location and a second OLT is deployed at a second location: and a passive optical splitter for exchanging packets between the OLTs and the at least one ONU.

In an alternate implementation, the OLTs are configured to transmit a switchover signal and the OLTs are configured to receive a switchover signal from other OLTs. In another alternate implementation, when an OLT receives the switchover signal, the OLT executes a switchover process. In another alternate implementation, the OLT is configured such that after the switchover process IGMP and MAC address table information is determined.

In another alternate implementation, the system further includes one or more hosts configured to transmit a switchover signal, and wherein the OLTs are configured to receive said switchover signal from the one or more hosts. In another alternate implementation, when an OLT receives said switchover signal, the OLT executes a switchover process. In another alternate implementation, the system further includes one or more network switches operationally connected to the OLTs, the one or more network switches configured to interface between the OLTs and a network. In another alternate implementation, the OLTs are configured to maintain independently statistic counters for monitoring and troubleshooting.

In an alternate implementation, the system is configured to switch from using the first OLT to using the second OLT in less than 50 msec.

In an alternate implementation, system is configured to recalculate the round trip time (RTT) after OLT switchover while the at least one ONU is still registered.

BRIEF DESCRIPTION OF FIGURES

The embodiment is herein described, by way of example only, with reference to the accompanying drawings, wherein.

DETAILED DESCRIPTION

The principles and operation of the system according to the present embodiment may be better understood with reference to the drawings and the accompanying description. The present embodiment is a system for redundancy in Ethernet passive optical networks (EPONs). The system facilitates fast recovery from failure, specifically with a recovery time of less than 50 msec. The system also facilitates path redundancy of the fiber optic network. The system also facilitates implementation with location redundancy of the OLTs, which facilitates greater path redundancy of the fiber optic network. Security information for the standby OLT can be updated asynchronously from the main OLT. Note that this system can be used to provide N:1 redundancy. For clarity, the description first describes an implementation of 2:1 redundancy and then describes how this implementation can be extended to provide an N:1 implementation.

Figure 2:
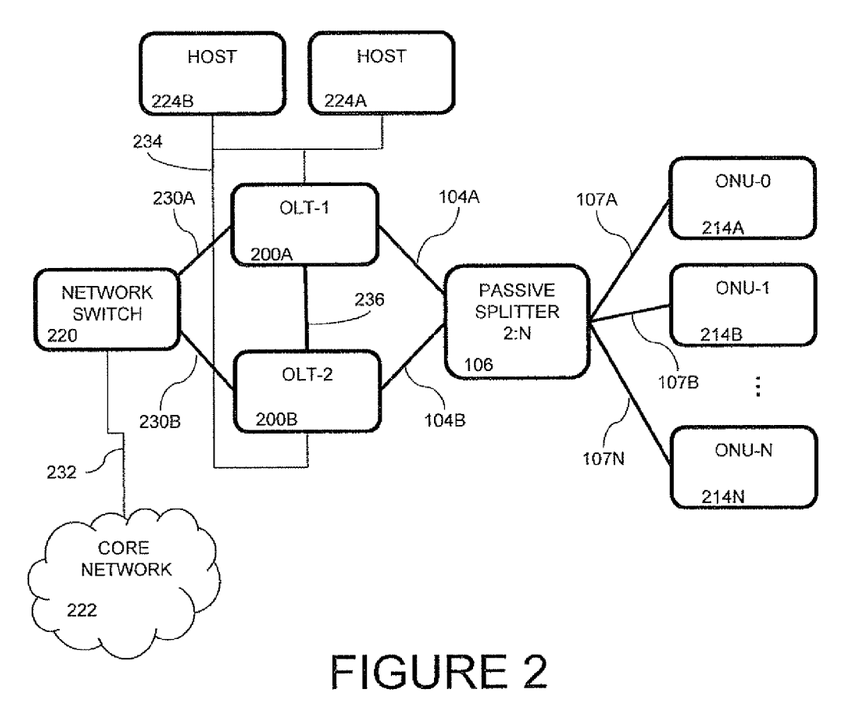
FIG. 2, a diagram of a redundant EPON network

Referring now to the drawings, FIG. 2, a diagram of a redundant EPON network, a first optical line transmission equipment (OLT) 200A is deployed at a first location and a second OLT 200B is deployed at a second location. Deploying each OLT at different physical locations facilitates location redundancy. The specific application and desired level of location redundancy will provide requirements for determining what locations will be sufficient to satisfy the location redundancy requirements. In one implementation, the OLTs are deployed in the same room, or even in the same chassis, with each OLT having independent power supplies and network connections. In another implementation, each OLT is deployed in a different building. The location redundancy configuration of OLTs will be limited by the operating parameters of the EPON specification and deployment realities. The OLTs are configured to send and receive packets over first communication channels 104A and 104B, respectively, to passive optical splitter 106. Second communication channels 107A, 107B, and 107N, operationally connect the passive optical splitter 106 to one or more associated optical networking units (ONUs) 214A, 214B, and 214N, respectively. In the context of this description, an active communication channel is a communication channel from which packets are received and to which packets can be transmitted between given devices on the communications channel. In the context of this description a quiet communications channel is a communications channel which is not communicating packets between given devices on the communications channel. A quiet communications channel can physically have signals being carried on the communications channel and reaching the physical input of a device on the network, but if the signal is not intended for the receiving device, or if the receiving device is not able to process the signal, the communications channel is considered quiet for that device. A non-limiting example of a quiet channel is the case where packets are being transmitted from an OLT to an ONU, but the ONU does not have the correct security key to decrypt the received packets. In this case, the ONU is not receiving usable data and the input communications channel is considered quiet.

In a normal state, the ONUs are configured to monitor an associated second communication channel. When an associated second communication channel is quiet for a minimum length of time, a conventional ONU transitions from a normal state to a deregistered state, requiring approximately 1000 msec to reregister during which application data is not transmitted or received. In one implementation, to avoid deregistration the ONUs are configured with an innovative "lenient state". When an associated communication channel is quiet for a minimum length of time, the ONU transitions from a normal state to a lenient state. In the lenient state, the ONU starts accepting both the old (the previously used) security key and the current security key for decrypting received packets, as described below. The old security key is used for encrypting and transmitting packets. This lenient state allows the ONU to receive a packet, the ONU's timestamp is updated based on the packet's timestamp, and the ONU's security counter is updated based on the packet's security counter. After a packet is received in the lenient state, the ONU transitions to a normal state of operation. When the ONU is in a lenient state and a packet is not received for a given length of time, the ONU transitions to a deregistered state. Using a lenient state reduces the switchover time from an average of 1000 msec to a worst case of 21 msec, as will be described below.

Hosts 224A, 2248, are connected to OLT-1 200A, and OLT-2 200B by communication channel 234. Network switch 220 is connected to OLT-1 200A and OLT-2 200B by communication channels 230A, and 230B, respectively. The network switch 220 provides connectivity via communications channel 232 to the core network 222. Communications channel 236 between OLT-1 200A and OLT-2 200B is for general-purpose input/output pins (GPIO) connection and in the context of this document is referred to as the GPIO connection. GPIO output pins from OLT-1 200A connect to GPIO input pins on OLT-2200B. Similarly, GPIO output pins from OLT-2 200B connect to GPIO input pins on OLT-1 200A. In an implementation where the OLTs are relatively close, a cable can be used to connect directly to the OLTs' GPIO. In an implementation where the OLTs are deployed in a physically diverse configuration, the GPIO communication channel can be remoted as appropriate to the application. Techniques for remoting communicating channels are known in the art, and based on this description one familiar with the art will be able to implement an appropriate technique. The GPIO connection is configured to transmit a switchover signal from the main OLT-1 200A to the standby OLT-2 200B. When OLT-2 200B receives a switchover signal, the switchover process begins for OLT-2 200B. One preferred implementation for transmitting a switchover signal is by lowering the main OLT's GPIO to '0'. This can be done by setting the GPIO to input mode where the output gets a 'high Z' value and is pulled down by the pull-down resistor. In this preferred implementation of transmitting a switchover signal, if the main OLT signals a low level or if there is a power failure of the main OLT, the standby OLT receives a switchover signal. This allows the standby OLT to recognize a power failure of the main OLT. Note that as described elsewhere, after the switchover process is complete OLT-2 200B has become the main OLT and OLT-1 200A has become the standby OLT in preparation for future switchovers.

Fiber protection switching, also known as OLT switchover, can be initiated by a variety of circumstances including:

The main OLT has detected a problem with the fiber communications channel;

The standby OLT recognizes a power failure of the main OLT; and     A switchover command is given to the OLTs.

The standby and main OLTs can be deployed in a variety of configurations, including, but not limited to, each OLT located in a different physical location, the OLT's co-located but deployed in separate chassis, or OLT printed circuit boards (PCBs) deployed in the same chassis. In a case where the OLTs are implemented on separate printed circuit boards in the same chassis, there is no need to synchronize clock and reset signals between the two boards. Each OLT has an associated fiber for communications with the EPON. The choice of initially which OLT is the main OLT and which OLT is the standby OLT is dependent on the specifics of the application and deployment requirements. Once in use, either unit can function as the main OLT and the other unit will be the standby OLT. After a switchover is completed, the former main OLT becomes the standby OLT and the former standby OLT operates as the main OLT. It is not necessary to maintain a specific OLT permanently in a specific role as a main or standby OLT.

In this description, we arbitrarily choose OLT-1 200A, as the initially main OLT and OLT-2 200B as the initially standby OLT to assist in describing the OLT switchover. The standby OLT-2 200B is passive, not initiating transactions on communications channel 104B to the EPON or to the network switch via communications channel 230B. Similarly, one of the hosts 224A is considered the main host and provides configuration information, command, control, and monitoring of the OLTs. Information maintained by the host includes which ONUs are registered and dynamic bandwidth allocation (DBA) order of the ONUs, address table, IGMP proxy table, ONU networking settings, security status (enabled/ keys) of each ONU, and static OLT configurations such as classification rules. The main host 224A actively updates and is updated by the main OLT-1 200A. The main host 224A updates the standby OLT-2 200B and can update the standby host 224B.

Figure 3:
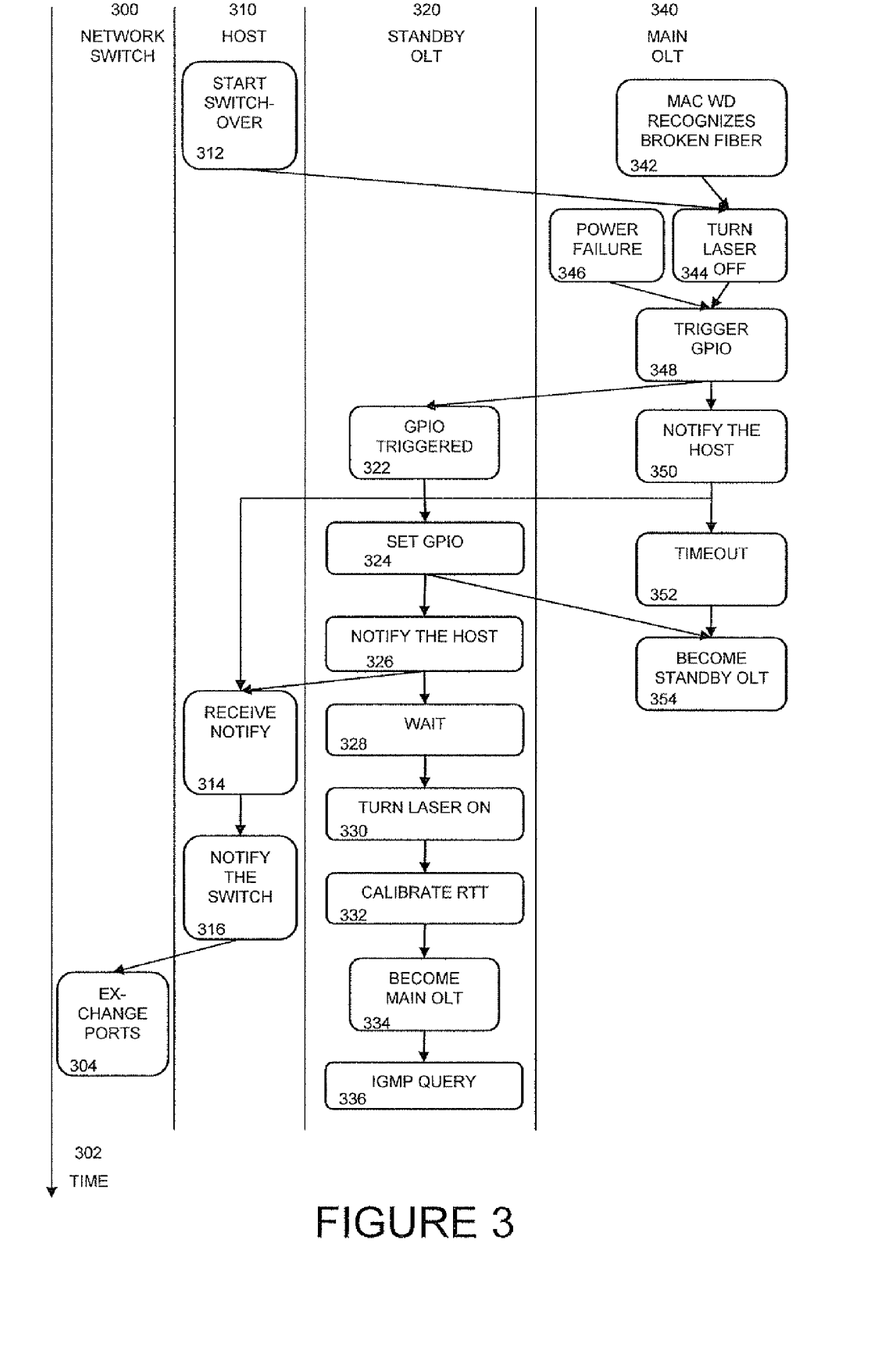
FIG. 3, a timing flow diagram of the OLT switchover process

Referring to FIG. 3, a timing flow diagram of the OLT switchover process, column 300 is for actions of the switch, column 310 the host, column 320 the initial standby OLT, and column 340 the initial main OLT. The flow down the page is relative time 302. Note that lengths of time described in this document are preferable, but timeouts and waiting periods are configurable, and the system can be configure with specific lengths of time appropriate to the application. The switchover process can be initiated in a variety of ways, including, but not limited to: the host 310 issuing a start switchover command 312 to the main OLT 340, the main OLT detecting a problem 342 with the fiber communications channel, the main OLT not detecting any upstream traffic, or by detecting a problem with the fiber optic network (for example via fiber monitoring), in which cases the main OLT 340 stops transmitting 344, by turning off the transmit laser.

After transmission has stopped 344, the main OLT 340 triggers 348 the GPIO. The switchover process can also be initiated when the main OLT 340 has a power failure 346, in which case due to loss of power the GPIO is triggered 348 (and the laser turns off due to the power failure). In one implementation, the GPIO is triggered according to the pull-down resistor technique described above. In one case, the switchover command is given to the main OLT to take the main OLT out of use and perform maintenance on the main OLT. In another case, if the main OLT is malfunctioning, the OLT still has power and the GPIO will not be pulled down. One non-limiting example of a malfunctioning OLT is where there is a problem with a processor on the OLT (commonly known as a "stuck" or "hung" CPU). Another non-limiting example of a malfunctioning OLT is where there is a problem with the OLT PON receive line, resulting in a quiet communications channel. For this case, a watchdog process on the host monitors the main OLT, and if the main OLT does not respond to the watchdog process then the host initiates a start switchover command to the standby OLT to start the switchover process.

Continuing with the switchover process for the main OLT 340 in the case where there is still power to the main OLT, after the GPIO is triggered the main OLT notifies 350 the host 310 that the main OLT will no longer function as the main OLT. The OLT 340 waits 352 a timeout period to allow the original standby OLT 320 to start functioning as the new main OLT and then the OLT 340 becomes the new standby OLT 354. The timeout period should preferably be at least twice the dynamic bandwidth allocation (DBA) cycle to assure that none of the ONUs has to transmit any more upstream packets. In one non-limiting example, the DBA cycle is 0.5 msec and the timeout is set to 3 msec. Alternatively, when the OLT 320 sets the GPIO 324 then OLT 340 becomes the new standby OLT 354.

In some conventional systems, the OLT monitors the EPON network, but these conventional systems still need to solve the synchronization and security issues previously described. The embodiment currently being described provides a more general solution where the standby (redundant) OLT 320 does not monitor the EPON network (listen to upstream traffic) because the standby OLT does not know when to expect to receive data and thus the standby OLT cannot synchronize to received data and cannot learn the EPON network.

When the main OLT 340 triggers 348 the GPIO, the GPIO trigger is detected 322 by the standby OLT 320. Note that when the standby OLT 320 is triggered and begins the process of becoming the new main OLT, the laser of the standby OLT is off. At any given time at most one OLT has a laser that is turned on, to facilitate correct multiplex control of the passive splitter 106 (FIG. 2). The standby OLT 320 switchover process starts by setting the GPIO 324. The host is notified 326 that the standby OLT 320 is operating as the main OLT, and then the OLT 320 waits 328 a timeout period, in one implementation 3 msec. This timeout period is necessary so the communications channels to the ONUs will be quiet, in other words in order to clear the line. The ONUs recognizes a period of time with no downstream traffic, stop transmitting, and transition to a lenient state. After waiting 328 a timeout period, the OLT 320 turns on 330 the transmit laser. The RTTs are then calibrated 332 from the new main OLT 320 to the ONUs. One technique for measuring the RTT is to send GATE commands from the OLT 320 to the ONUs to calibrate the RTT for each ONU. Another technique is to adapt the RTTs that were received from the host during the regular operation of synchronizing the databases from the main OLT to the standby OLT. The process of calibrating the RTT is comparable to performing a dedicated discovery process for each ONU, where each ONU is already registered using GATE/REPORT messages. The OLT sends to each ONU a GATE for a REPORT message. The received REPORT message is used to calculate the RTT.

The original standby OLT 320 starts operating 334 as the new main OLT, including starting operating the DBA. If applicable, the OLT 320 sends 336 IGMP queries in order to update the IGMP proxy table. The IGMP and MAC address tables cannot be copied from a main OLT to a standby OLT in real time. Therefore, after starting operation the new main OLT will learn missing information such as IGMP and MAC address table information.

During the switchover process, the host 310 receives 314 notification 350 from the main OLT 340 that the main OLT will no longer function as the main OLT or receives notification 326 from the standby OLT 320 that the standby OLT is operating as the main OLT. The host 310 notifies 316 the network switch 300 of the switchover from the main OLT 340 to the standby OLT 320 so the network switch can exchange ports 304 to stop routing data to the main OLT 340 and start routing data to the standby OLT 320.

Statistics counters are maintained by each OLT to facilitate monitoring and troubleshooting. Statistics can be read from both the active main OLT and from the old main/standby OLT. Synchronization of statistics between OLTs is not necessary. In one non-limiting example, a host is reading statistics from a first OLT that is operating as the active main OLT. A switchover occurs, and a second OLT is now operating as the main OLT. The host now reads statistics from the second OLT. If the host can still communicate with the first OLT, the host can also read (any remaining) statistics from the first OLT. This feature can be used when a failure occurs, or to facilitate manual switchover, such as in a case where maintenance or an upgrade to an OLT is needed. The time required for switchover can be calculated as follows: The times given are for the worst-case scenario:

The main OLT does not respond to a watchdog process: 3 msec

Trigger the GPIO switchover signal: 1 msec

Standby (new main) OLT waits for the EPON to go into the lenient state: 3 msec

RTT calculations for 64 ONUs: 14 msec for a total delay of 21 msec, which is below the desired 50 msec limit on switchover time.

For reference, the required time for the round trip time (RTT) delay calculation for 64 ONUs is as follows:

1 meter of fiber takes 1/(speed of light in fiber)=1 m/(200000000 m/s)=5 nsec

The maximum fiber length from OLT to ONU=20 km which takes 20 km*5 nsec/m=100 uSec.

Figure 4:
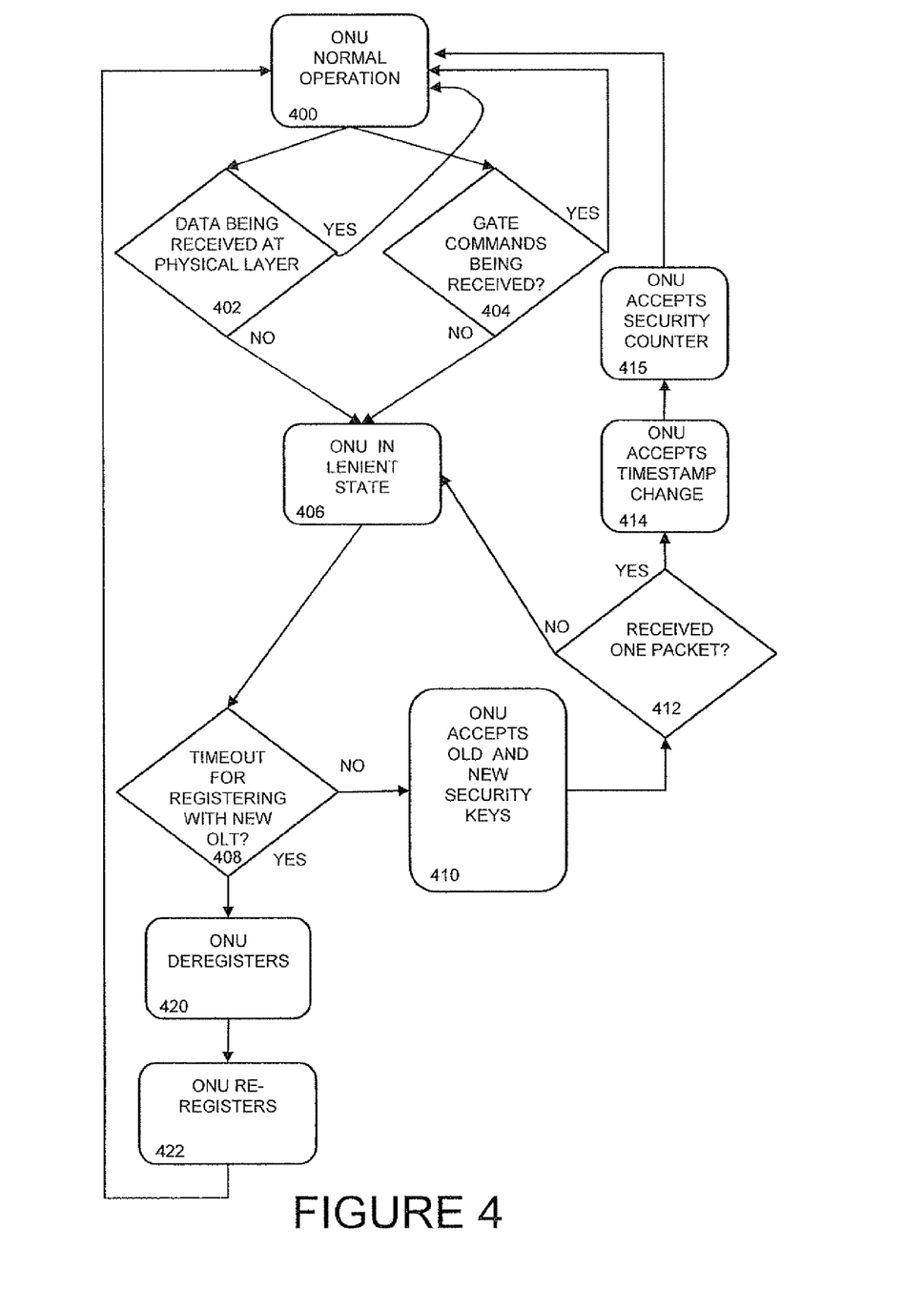
FIG. 4, a flow diagram of ONU lenient mode operation

The round trip time from an OLT to an ONU back to the OLT is:

[100 usec from an OLT to an ONU]+[20 usec for GATE processing in the ONU which is 1250 TQ from GATE to REPORT]+[100 usec from the ONU back to the OLT]=220 usec 64 ONUs*220 usec=14 msec Referring to FIG. 4, a flow diagram of ONU lenient mode operation, an ONU generally operates in a normal state, shown as block 400. Details of normal state operation for a conventional ONU are described in the IEEE 802.3 specification. As described elsewhere in this document, in a normal state, an ONU is configured to monitor an associated communication channel. Depending on the application, monitoring can be implemented using various techniques. In an optional implementation, the ONU monitors the associated communication channel at the physical layer, shown in block 402, for example to see if the ONU is receiving a signal. An alternative to physical layer monitoring, block 402, is a preferred implementation shown in block 404 where the ONU monitors if GATE commands are being received, and where lack of GATE commands indicates that the monitored communications channel is quiet. When an associated communication channel is quiet for a minimum length of time, the ONU transitions from a normal state to a lenient state, block 406. If the ONU does not receive a packet from the OLT within a given length of time while in the lenient state, the ONU has timed-out, shown in block 408, of the lenient state and the ONU transitions to the deregistered state, block 420. After deregistering, block 420, the ONU goes through conventional reregistration, block 422, and transitions to the normal state of operation.

While the ONU is in the lenient state, block 408, the ONU accepts both old and new security keys, shown in block 410, and described below. In other words, both the old and current security keys are used to try to decode received packets. Note that when the ONU enters the lenient state the ONU starts accepting old and new keys, shown in block 410, after which the ONU continues to accept the same old and new keys. In an alternate implementation, after switchover the OLT sends unsecured packets to the ONU, and the ONU while in lenient mode accepts unsecured packets and transmits unsecured packets, until a new security connection is established, in other words until a new security key has been exchanged. While the communications is quiet and the ONU has not yet received a packet, block 412, the ONU remains in the lenient state, block 406. If the ONU receives a packet, the ONU's timestamp is updated, block 414, based on the packet's timestamp, the ONU accepts the security counter, block 415, of the packet, and the ONU transitions to the normal state of operation, block 400. As described previously, if there is a timestamp drift of greater than 16 TQ (256 nsec) in the timestamp received from an OLT by an ONU, conventional ONUs will deregister. An ONU in a lenient state allows the ONU to update the timestamp variable on the ONU without deregistering, facilitating a fast recovery from failure. Accepting only a one-time adjustment of the ONU timestamp counter provides protection against replay attacks on the ONU. Another protection against replay attacks that can be implemented in a communications network is to assign each packet a security counter. One non-limiting example is IEEE standard 802.1 AE where each packet gets a security counter which increments from one packet to the next transmitted packet. When a conventional ONU receives a packet with a wrong security counter, the ONU will ignore the packet. As long as the received packets continue to have a security counter that is not acceptable, the ONU will continue to ignore the packets, resulting in a quiet state for the ONU and eventually deregistration of the ONU. An ONU in a lenient state allows the ONU to accept one time a new security counter, or in other words accept a bad security counter. Accepting a new security counter allows the ONU to continue receiving packets, preventing a quiet state, avoiding deregistering, and facilitating a fast recovery from failure. Implementation of the above-described lenient state features can vary depending on the specific application. A non-limiting example of implementing the feature of one-time acceptance of a new security counter uses the replayProtect variable in IEEE standard 802.1AE. When an ONU enters the lenient state, the replayProtect variable is turned off, allowing the ONU to accept a new security counter. When a packet is received by the ONU and a new security counter has been accepted (as well as the ONU performing the other above-described functions), the ONU transitions to the normal state and the replayProtect variable is turned on. Based on this description one familiar with the art will be able to implement appropriate techniques.

To implement the security feature of the lenient state, when an ONU is in the normal state and the ONU issues a new security key, the new security key is sent to the associated OLT, the ONU starts using the new security key, and the ONU and the OLT retain the security key that was being used, now called the old security key. This retaining of the old security key occurs every time a new security key is issued. In a non-limiting example, a first security key is being used by an ONU. When a second security key, also called the new security key is issued, the first security key is no longer used for encryption and decryption, but is retained by the ONU and by the OLT as the old security key. When a third security key is issued, the first security key is discarded, the second security key becomes the old security key, and the third (new) security key is used for encryption and decryption of transmitted and received packets. If the ONU does not receive data for a minimum length of time, the ONU transitions to the lenient state, as described above. In the lenient state both the second (old) and third (new) security keys are used to try to decrypt packets. If the ONU transmits data while in the lenient state, the ONU uses the old security key to encrypt the data to be transmitted because the new OLT may not yet have the new security key that was being used between the ONU and the old OLT. Note that if the new OLT does have the new security key, the new OLT will be able to decrypt with the old security key. If even using both the old and new keys, no recognizable packets are received, after a given length of time the ONU transitions to the deregistered state. If a packet is successfully decrypted and recognized using the second security key (in our continuing example the old security key), the ONU's timestamp is updated with the timestamp of the received packet, the ONU transitions to the normal state, and the second key is used by the ONU to encrypt/transmit and decrypt/receive data. Now in the normal state, when a new fourth security key is issued the third security key is not retained, the second security key is retained as the old security key and the fourth security key becomes the new security key (the third security key is discarded).

Referring back to FIG. 2, the fault tolerance of the system can be improved by implementing redundancy in the various components and communication channels. In one implementation, instead of communications channel 234 being implemented as a single shared network, communications channel 234 is implemented with redundant connections to each OLT and between the hosts. In other implementations redundant network switches 220 and redundant associated communication channels 230A, 230B, 232 can be implemented. Based on this description and the requirements of the application, one skilled in the art will be able to implement a system providing the required fault tolerance.

Figure 5:
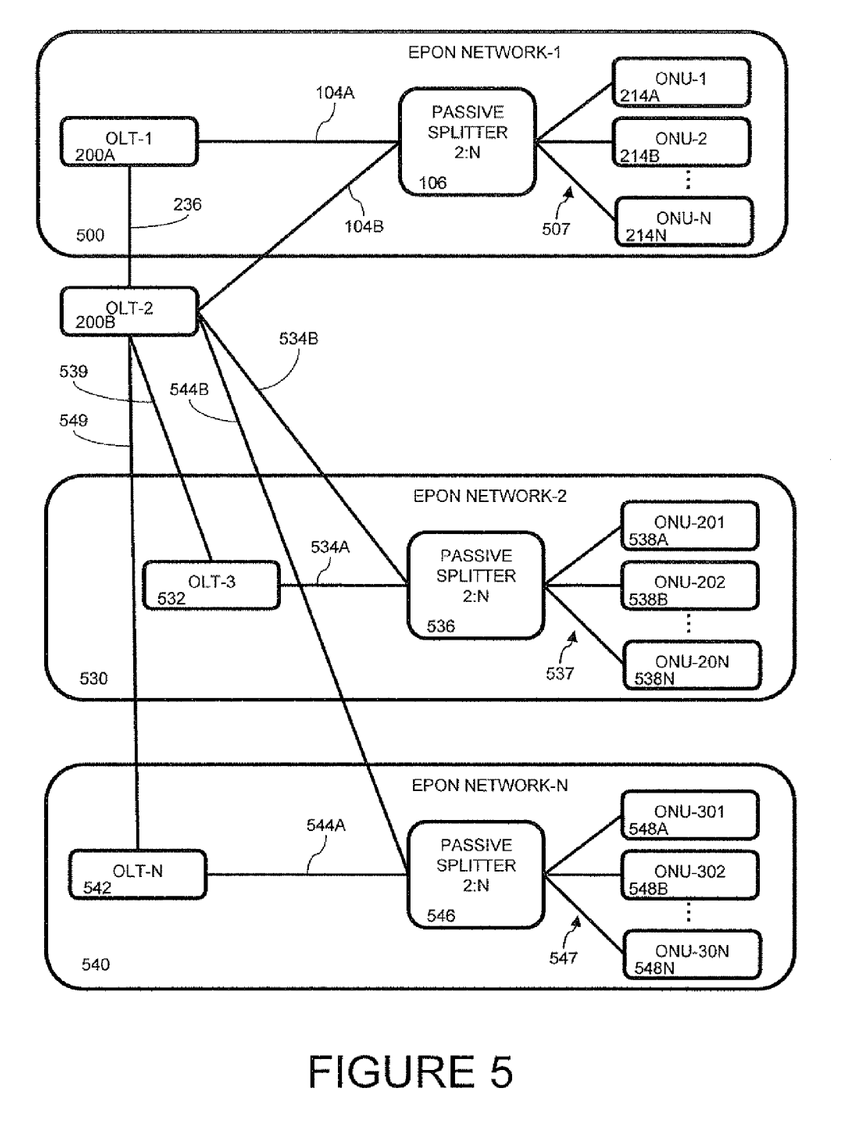
FIG. 5, a diagram of an example of an N:1 redundant EPON network.

As previously mentioned, the above description of an implementation of 2:1 redundancy can be extended to provide an N:1 implementation. Referring to FIG. 5, a diagram of an example of an N:1 redundant EPON network, three EPON networks are shown with a single standby OLT. EPON network-1, 500 is similar to the description of FIG. 2. OLT-1

200A is deployed at a first location connected via communication channel 104A to passive optical splitter 106. Communication channels 507 operationally connect the passive optical splitter 106 to one or more associated ONUs 214A, 214B, and 214N. For clarity, the hosts, network switches, communication channels, and other components are not drawn in FIG. 5 for each EPON.

Similar to EPON network-1, EPON network-2 530 includes OLT-3 532 connected via communication channel 534 to passive optical splitter 536. Communication channels 537 operationally connect the passive optical splitter 536 to one or more associated ONUs 538A, 538B, and 538N. EPON network-3 540 includes OLT-N 542 connected via communication channel 544 to passive optical splitter 546. Communication channel 547 operationally connects the passive optical splitter 546 to one or more associated ONUs 548A, 548B, and 548N.

A common standby OLT-2 200B is deployed at a second location and connected to passive splitters 106, 536, and 546 via communication channels 104B, 534B, and 5448, respectively. OLT-2 200B is connected to OLT-1 200A, OLT-3 532, and OLT-N 542 via communication channels 236, 539, and 549, respectively, to provide the above-described GPIO functionality. As described with respect to FIG. 2, the components can be deployed co-located or in physically diverse locations. Based on the above description and example N:1 network, one skilled in the art will be able to implement other N:1 networks.

It will be appreciated that the above descriptions are intended only to serve as examples, and that many other embodiments are possible within the scope of the present invention as defined in the appended claims.

What is claimed is:

1. A system for redundancy in Ethernet passive optical networks (EPONs) comprising:
   (a) at least one optical networking unit (ONU), wherein when said ONU is in a normal state said ONU monitors input communications on an encrypted path that is encrypted with a first encryption key from a first OLT and uses a first timestamp to avoid deregistration by the first OLT, and wherein when said input communications are quiet for a predetermined minimum length of time said ONU transitions to a lenient state, said transition independent of said first OLT, said lenient state in which:
   (i) said ONU decrypts using said first encryption key and a second encryption key from a second OLT;
   (ii) upon transmitting a packet said ONU uses said first encryption key to encrypt the transmitted packet; and
   (iii) upon receiving a packet:
      (A) said ONU updates an ONU timestamp based on said packet's timestamp and begins to use the updated ONU timestamp to avoid deregistration by said second OLT; and
      (B) said ONU transitions to said normal state of operation;
   wherein while said ONU is in said lenient state, if said input communications are quiet for a predetermined given length of time said ONU transitions to a deregistered state.

2. The system of claim 1 wherein upon receiving said packet said ONU further updates an ONU security counter based on a security counter of said packet.

3. The system of claim 1 wherein
said first OLT is deployed at a first location and said second OLT is deployed at a second location and further comprising:
   (b) a passive optical splitter for exchanging packets between the OLTs and said at least one ONU.

4. The system of claim 3 wherein the OLTs are configured to transmit a switchover signal and the OLTs are configured to receive a switchover signal from other OLTs.

5. The system of claim 4 wherein when an OLT receives said switchover signal, said OLT executes a switchover process.

6. The system of claim 5 wherein said OLT is configured such that after said switchover process IGMP and MAC address table information is determined.

7. The system of claim 3 further comprising:
   (c) one or more hosts configured to transmit a switchover signal, and wherein the OLTs are configured to receive a switchover signal from said one or more hosts.

8. The system of claim 7 wherein when an OLT receives said switchover signal, said OLT executes a switchover process.

9. The system of claim 3 further comprising one or more network switches operationally connected to the OLTs, said one or more network switches configured to interface between the OLTs and a network.

10. The system of claim 3 wherein the OLTs are configured to maintain independently statistic counters for monitoring and troubleshooting.

11. The system of claim 1 wherein said input communications are quiet due to a cause for not communicating packets between said ONU and the OLTs selected from the group consisting of: not receiving packets at said ONU; and said ONU not having a correct security key to decrypt received packets.

* * * * *